(12) United States Patent
Todd et al.

(10) Patent No.: US 8,091,780 B2
(45) Date of Patent: Jan. 10, 2012

(54) SYSTEM, METHOD, AND APPARATUS OF A CUSTOMER INTERFACE DEVICE

(75) Inventors: Jason Todd, Lowell, AR (US); Tim Webb, Rogers, AR (US)

(73) Assignee: Wal-Mart Stores, Inc., Bentonville, AR (US)

( * ) Notice: Subject to any disclaimer, the term of this patent is extended or adjusted under 35 U.S.C. 154(b) by 210 days.

(21) Appl. No.: 12/418,382

(22) Filed: Apr. 3, 2009

(65) Prior Publication Data

US 2009/0250515 A1 Oct. 8, 2009

Related U.S. Application Data

(60) Provisional application No. 61/042,929, filed on Apr. 7, 2008.

(51) Int. Cl.
*G06K 5/00* (2006.01)
(52) U.S. Cl. ........................................................ 235/380
(58) Field of Classification Search .................... 235/380
See application file for complete search history.

(56) References Cited

U.S. PATENT DOCUMENTS

| | | | | |
|---|---|---|---|---|
| 5,315,096 | A * | 5/1994 | Muller et al. | 235/462.13 |
| 6,234,389 | B1 * | 5/2001 | Valliani et al. | 235/380 |
| 2004/0234117 | A1 * | 11/2004 | Tibor | 382/137 |
| 2005/0038712 | A1 * | 2/2005 | Veeneman | 705/26 |
| 2005/0234778 | A1 | 10/2005 | Sperduti et al. | |
| 2006/0080174 | A1 | 4/2006 | Veeneman et al. | |
| 2007/0038565 | A1 * | 2/2007 | Bartz et al. | 705/41 |
| 2007/0069013 | A1 * | 3/2007 | Seifert et al. | 235/383 |
| 2007/0162184 | A1 | 7/2007 | Pinney et al. | |
| 2008/0133373 | A1 * | 6/2008 | Perdomo et al. | 705/18 |
| 2008/0208758 | A1 * | 8/2008 | Spiker et al. | 705/70 |
| 2008/0306761 | A1 * | 12/2008 | George et al. | 705/2 |

OTHER PUBLICATIONS

International Search Report of related International Application No. PCT/US09/39540, dated Jun. 3, 2009.

* cited by examiner

*Primary Examiner* — Thien M. Le
*Assistant Examiner* — Christle Marshall
(74) *Attorney, Agent, or Firm* — Kenyon & Kenyon LLP

(57) ABSTRACT

A customer interface device for interfacing with a customer at a store may include a touch screen for displaying information and receiving customer instructions, a keypad, a wireless sensor for scanning tags attached to merchandise of the store, and at least one user input component to accept customer payment for items to be purchased, wherein the touch screen, the keypad, the wireless sensor and the at least one user input component are detachable modular components.

22 Claims, 4 Drawing Sheets

SYSTEM, METHOD, AND APPARATUS OF A CUSTOMER INTERFACE DEVICE

CROSS-REFERENCE TO RELATED APPLICATIONS

This application claims priority to U.S. Provisional Patent Application No. 61/042,929, filed Apr. 7, 2008, entitled "Retail Customer Interface Device," which is herein incorporated by reference in its entirety.

FIELD OF THE INVENTION

The present invention relates to a system, method, and apparatus for a customer interface device at a store. In particular, the present invention relates to a system, method, and apparatus of using a comprehensive yet flexible device to improve interfacing with customers at the store.

BACKGROUND INFORMATION

A store, e.g., a Wal-Mart store, may interact with a customer to facilitate or enhance the customer's shopping experience. Currently, interfacing with customers is limited and usually requires installation of multiple interface devices to increase interaction. FIG. 1 illustrates a typical computer system and a variety of typical interface devices used in a retail store. For example, merchandise in the store may be encoded with barcodes and stored in an inventory database 102 at a centralized location, e.g., a headquarter, before or upon their arrival at the store. The database 102 may be connected to a server computer 106 through a first local area network 108 (LAN). The server computer 106 may manage transactions between the inventory database 102 with other functionalities, e.g., a financial/accounting database 104. The LAN 108 in the headquarter may be linked through a wide area network (WAN) 110 to, e.g., a LAN 112 at a store. For a chain of stores, e.g., Wal-Mart Stores, the server computer 106 at the headquarter may be linked to multiple stores. In some situations, the server computer 106 and databases 102, 104 may be located locally at the store.

Within each store, multiple checkout counters or point of sale (POS) stations 114, 116 may be set up at different locations for customers to conduct purchase transactions. These POS stations 114, 116 may be linked through the LAN 112 and WAN 110 to the server computer 106, and databases 102, 104. Additionally, POS stations 114, 116 may be configured with barcode scanners 118, 120, transaction panels 122, 124 and card readers 132, 134. A customer may bring items that he wants to purchase to a POS station for a transaction. The merchandise may have been labeled or attached with barcodes. A cashier may scan each item using barcode scanners 118, 120 to generate a list of pending items and corresponding prices for the customer. The customer may agree to and complete the purchase by paying with, e.g., cash or a check, or with credit (e.g., swiping a credit/debit card using card readers 132, 134).

These traditional barcode-based POS stations require the scanning of each item to be purchased by a cashier, which may be time-consuming and require human resources that may be deployed for other purposes, e.g., customer services. Further, these POS stations 114, 116 each includes multiple devices, such as, a display screen (e.g., transaction panels 122, 124), a bar code scanner (e.g., barcode scanner 118, 120), a card reader for plastic cards with magnetic strips (e.g., 132, 134), a keypad for entering pin numbers, and a signature pad for capturing a customer's signature. Theses devices may be scattered around a POS station in a confusing manner. In some stores, a single unit may be provided to customers for at check out stations. However, the single unit normally provides limited functionality, such as only accepting magnetic cards, and may not include other helpful interface devices such as a display screen. Thus, the POS stations need to be better organized to streamline customer transactions to increase customer satisfactions and store efficiencies.

Moreover, within the store, one or more price checkers (e.g., price checker 130) and/or gift register 128 may be installed. The price checker 130 may be equipped with a barcode scanner. Thus, when an item is scanned, the price checker 130 may retrieve price information from the inventory database 102 and presents the price information to a customer. In some instances, the price checker 130 may be a portable scanner (e.g., wireless connected to the LAN 112) that enables a customer to check prices anywhere in a store. The gift register 128 is usually a user terminal. Typically, the gift register 128 is a customized computer terminal with display and input devices (e.g., a mouse and/or keyboard). Thus, a user may create a gift registry while visiting a store and enter desired items into the gift registry. Later a gift purchaser may visit the store, view the gift registry and purchase one or more desired items from an established gift registry. However, such price checkers (e.g., stationary or portable) or gift registry terminals, are normally not capable of conducting financial transactions, such as accepting a payment, at the same spot in the store where the customer picks up or obtains a particular piece of merchandise.

Touch screen displays have been used as display screens in a retail or wholesale system. However, current devices with touch screen displays offer limited customer interaction. For example, touch screen displays have been used at POS stations at retail stores. But these touch screen displays have to be used together with other devices such as bar code scanners and/or swipe card readers. Thus, these touch screen display devices rarely operates as stand alone units.

In some instances, touch screen displays may be used to provide a directory service, or may introduce or advertise merchandise to customers. However, these informational touch screen displays devices do not provide financial transaction capablility. Further, in some stores, touch screens are equipped on handheld devices, but these handheld devices normally have to be used in conjunction with other separate and distinct devices, such as a swipe card reader, to conduct transactions.

DETAILED DESCRIPTION OF EXAMPLE EMBODIMENTS

Figure 1:
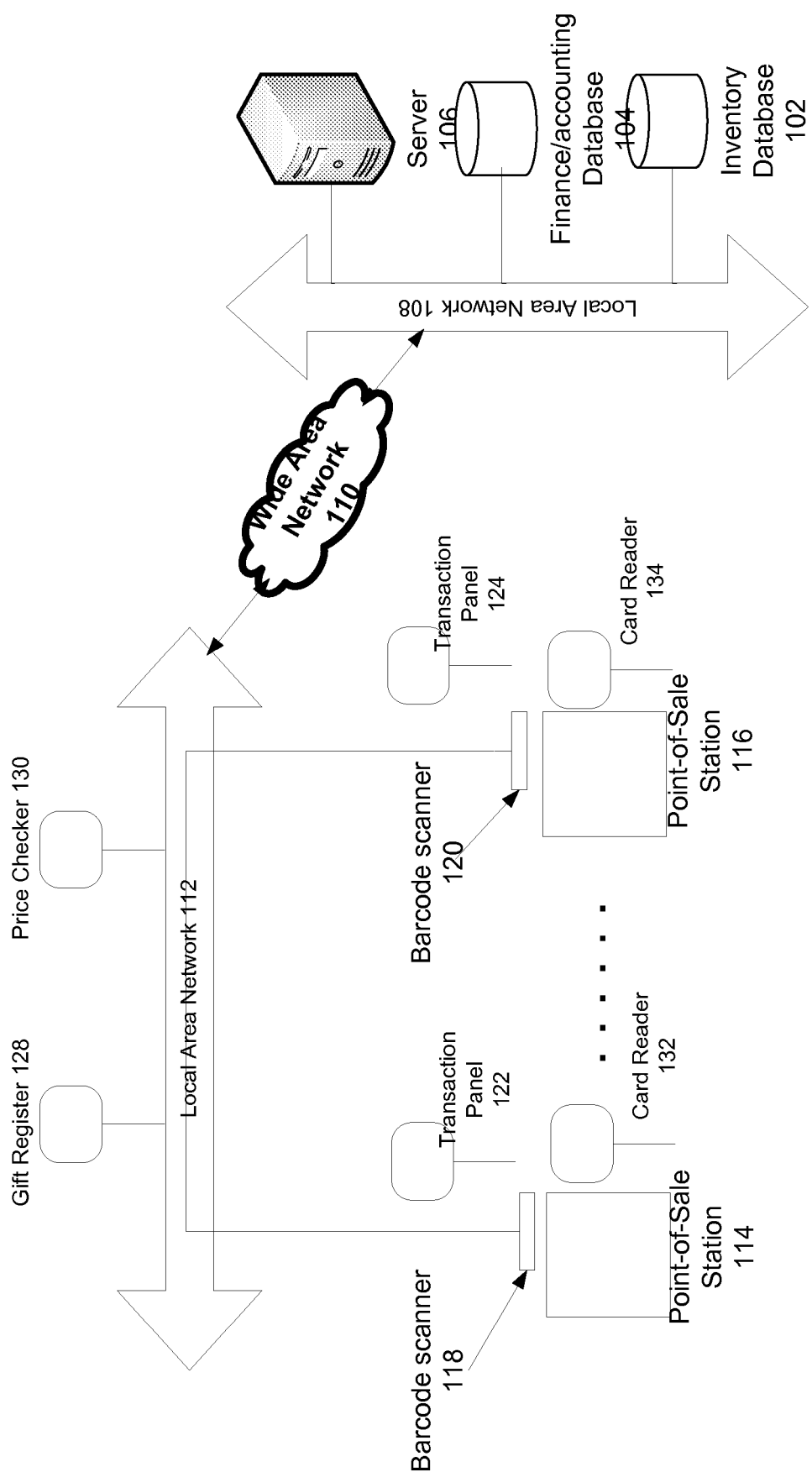
FIG. 1 shows examples of conventional customer interfacing devices.
Figure 2:
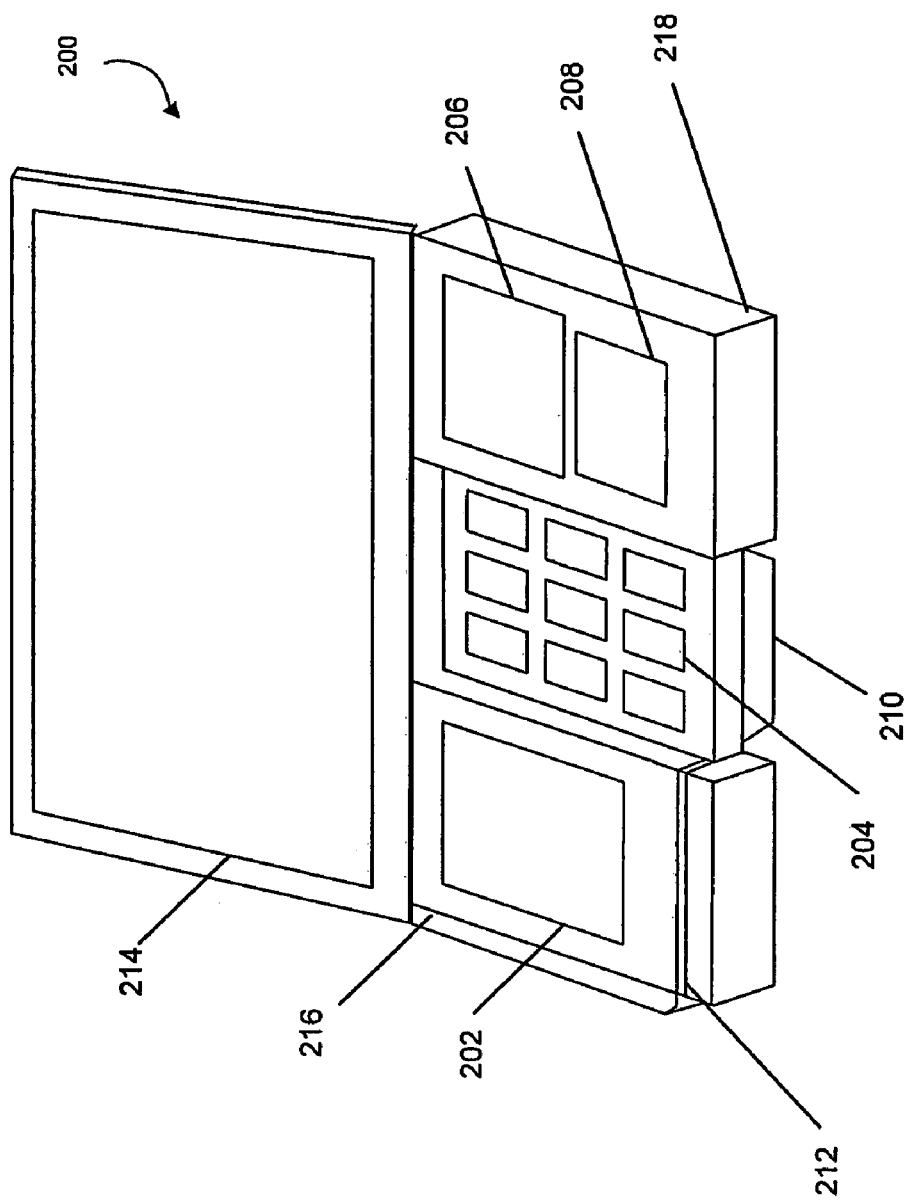
FIG. 2 shows an example customer interface device in accordance with an aspect of the present invention.

FIG. 2 shows an example customer interface device 200 in accordance with an aspect of the present invention. The example customer interface device 200 may comprise a wireless sensor 202, a keypad 204, a signature capture pad 206, a plug-in expansion slot 208, a smart chip and pin reader 210, a magnetic strip reader 212, and a screen display 214. In one embodiment, the signature capture pad 206 and the plug-in expansion slot 208 may be part of a side unit 218. The plug-in expansion slot 208 may accommodate a biometrics plug-in unit, such as, but not limited to, a finger print scanner or a retinal scanner. The screen display 214 may be detachably coupled to the top of the wireless sensor 202, the keypad 204 and the side unit 218.

In one embodiment, the wireless sensor 202 may be a modular component. For example, the wireless sensor 202 may be a component detachably coupled to the screen display 214 and/or the keypad 204. The wireless sensor 202 may have a certain size. One side of the wireless sensor 202 may match a first docking side of the keypad 204 and another side may match a certain segment of the bottom of the screen display 214. The wireless sensor 202 may be detached from the customer interface device 200 and replaced with another modular component of similar size.

In one embodiment, the wireless sensor 202 may comprise an expendable connector 216 at one side. The expandable slot 216 may be adapted to removably attach another modular component. The screen display 214 may have a certain width that matches the total width of the wireless sensor 202, the keypad 210 and the side unit 218 as shown in FIG. 2. Alternatively, the screen display 214 may have a different width that matches the total width of the wireless sensor 202, the keypad 210 and the side unit 218 and an additional modular component to be attached to the expandable slot 216.

In one embodiment, the side unit 218 may also be a modular component. It may be detachably coupled to a second docking side of the keypad 204 and may be detached and replaced with other modular components. The side unit 218 may also comprise an expandable slot (not shown). One or more modular components may be added to either expendable connector 216 or the expandable slot of the side unit 218 to fit screens of various sizes.

In one or more embodiments, a modular component may be a detachable rectangular device that can be attached by one or more sides. Each detachable modular components may have certain functionality (e.g., swipe card reader) and may comprise a communication interface to be detachably connected with the customer interface device 200 when attached thereon. The communication interface may use any known electronic communication technology, such as, but not limited to, serial communication, parallel communication, USB, IEEE Firewire.

In one embodiment, the wireless sensor 202 may be a device that uses a wireless communication technology, such as, but not limited to, near field communication (NFC) or Radio Frequency Identifier (RFID) communication. For example, the wireless sensor 202 may implement NFC and may be implemented as a tap-and-go card reader. In another example, merchandise in store may be labeled with RFID tags. RFID tags may be manually labeled or may be associated with merchandise using an existing barcode system. The wireless sensor 202 may include an RFID tag scanner.

In one embodiment, the keypad 204 may be a tactile keypad. A customer may use the keypad 204 to enter a pin or other personal identification code. The magnetic stripe reader 112 may read information encoded in the magnetic stripe located on the back of a plastic badge or plastic card, such as, but not limited to, a credit card or a debit card.

In one embodiment, the customer interface device 200 may be used at a POS station. The customer interface device 200 may be wired or wirelessly connected to a LAN of the store. The display screen 214 may be a touch screen that allows direct communication with a customer. A customer may scan the items to be checked out. For example, the customer interface device 200 may include a barcode scanner, or the wireless sensor 202 may include an RFID scanner. And the customer may use the customer interface device 200 to complete the transaction. The customer may verify the prices for each piece of merchandise as they are displayed on the display screen 214. The display screen may prompt customer to choose payment options. The customer may choose to pay using a credit card, for example, and may swipe a credit card at the magnetic strip reader 212 of the customer interface device 200.

In one embodiment, a merchant (e.g., a chain of stores) may provide registration services to customers that allow a customer to create a customer specific profile and maintain certain information with the stores. For example, a customer may register a personal account with a merchant operating chains of stores. The personal account may be identified by, for example, a telephone number or an account alias. Thus, using the customer interface device 200 at an POS of a store operated by the merchant, the customer may choose to access his personal account or to conduct the financial transaction using all available billing and payment options. For example, the customer may choose an option displayed on the display screen 214 that allows the customer to access customer profile information or personal accounts stored with the merchant. The customer may then enter a telephone number or account alias and a corresponding password to log in to an existing personal account. The customer may further choose a payment option already set up in the existing personal account, such as but not limited to, a credit card, a debit card, or a bank account.

In one embodiment, more than one credit card, more than one debit card, and more than one bank account may be recorded in an account profile with a merchant. In some situations, the customer may want to split the payment by several payment mechanisms. For example, a fraction may be paid by a first credit card in the account profile, another fraction may be paid by a second credit card by swiping it at the customer interface device 200, and yet another faction may be paid by a check. The customer interface device 200 allows the customer to choose any combination and any single payment option. Further, transaction preferences preset by the customer can also be provided by the customer interface device 200. For example, a transaction receipt can be emailed to a customer's default email address rather than being printed and provided to the customer.

In another embodiment, the customer interface device 200 may be used as a self-service station located anywhere inside a merchant's premises. For example, the customer interface device 200 may provide services to help a customer to refill a prescription (or to check on the status of an eyewear order, check on the status of car repair work, etc.).

In one embodiment, a customer interface device 200 may be located close to a pharmacy department within a store. A customer may use the customer interface device 200 to log in to an existing account and refill a prescription, thereby avoiding the need to wait in line to talk to a pharmacist. The customer may use a finger print scanner plugged into the expansion slot 208 to accomplish identification and login. Once the customer logs in, as described above, multiple payment options may be utilized. Further, the customer may have more than one prescription, thus the customer may choose any one prescription from a list of prescriptions that can be refilled. The list of prescriptions may be the actual name of a medicine or may be listed using a nickname or alias.

In those instances that a personal account has been established with the merchant, a customer may use the customer interface device 200 to select an option to receive receipts electronically. The electronic receipt may be stored in the personal account for the customer or forwarded to an email address specified by the customer. The email address may be one of many email accounts the customer entered previously or one that the customer entered on the spot when the customer enters the refill requirement.

In the example of prescription refill, a customer may enter an email account at the customer interface device 200 to receive notification. For example, the pharmacy of the merchant may notify the customer when the prescription is ready. Alternatively, at the customer interface device 200, a customer may enter a telephone number to receive notification when the prescription is ready (e.g., a call or text message).

In one embodiment, the example customer interface device 200 may be used at a customer service center or customer help kiosk. A customer may use it to search and locate items with the store.

Figure 3:
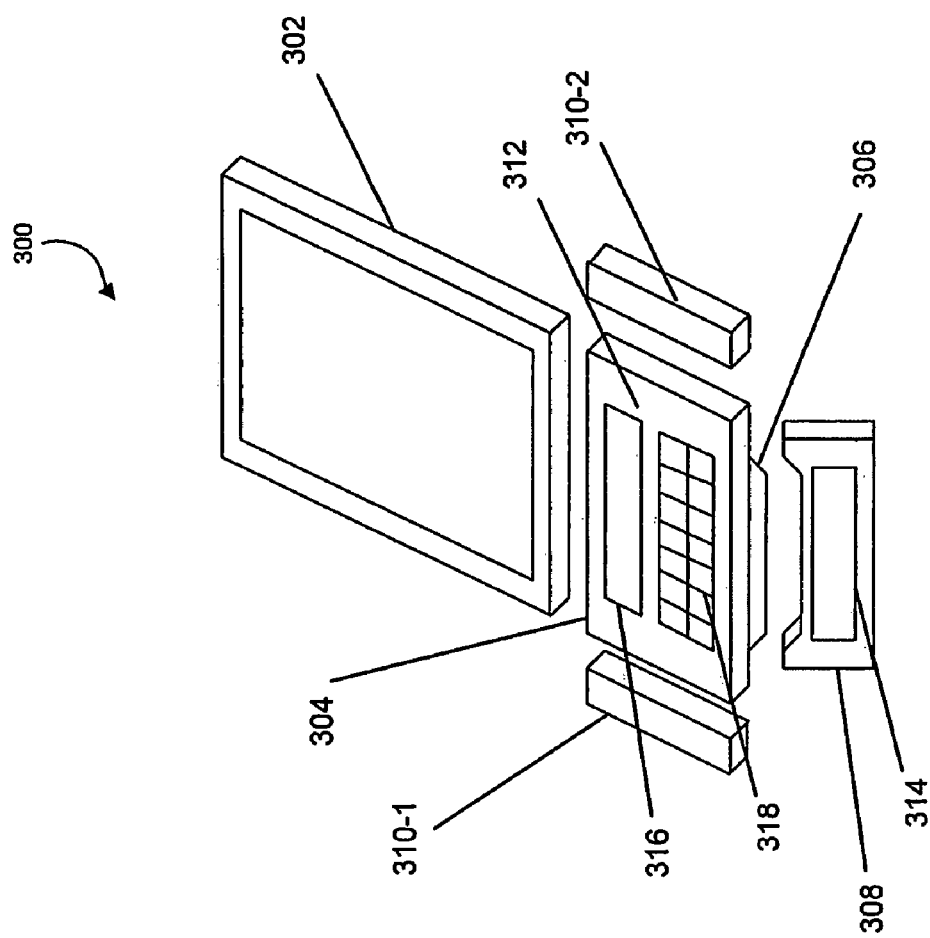
FIG. 3 shows another example customer interface device in accordance with an aspect of the present invention.

FIG. 3 illustrates an example customer interface device 300 in accordance with an aspect of the present invention. The customer interface device 300 may be a hand held device and comprise a touch screen 302 detachably attached to an expandable slot 304. In one embodiment, the touch screen 302 may comprise a built-in bar code scanner (not shown). In another embodiment, the touch screen 302 may include signature capturing functionality. The expandable slot 304 may be configured to attach touch screens of various sizes.

The customer interface device 300 may further comprise an integrated card slot 306. The integrated card slot 306 may contain a magnetic strip reader (MSR). In one embodiment, the integrated card slot 306 may contain a wireless sensor, such as a Smart Card reader, or an RFID reader, or any combination thereof.

The customer interface device 300 may further comprise a detachable modular component 308. The detachable modular component 308 may be an NFC reader, a biometrics unit, or an Electronic Product Code (EPC) reader, or any combination thereof.

In one embodiment, the customer interface device 300 may comprise spacers 310-1 and 310-2. The spacers 310-1 and 310-2 provide an accommodation to attach the touch screen 302 of differently size. In one or more embodiments, the spacers 310-1 and 310-2 may not be needed.

The example customer interface device 300 may comprise a keypad unit 312. The keypad unit 312 may comprise a display 316 and a secure pin entry unit 318. In one embodiment, the keypad unit 312 may comprise keys with braille dots. In another embodiment, the keypad unit 312 includes tactile keys. The detachable modular component 308 may be attached to the keypad unit 312 via a connection slot 314. In one embodiment, more than one detachable modular component 308 may be attached to the keypad unit 312.

In one embodiment, the customer interface device 300 may be adapted to connect with a merchant's computer network (e.g., LAN) with a wire using any wired connection as described above. In another embodiment, the customer interface device 300 may be adapted to connect with a merchant's computer network wirelessly. The wireless communication interface may be a Wi-Fi, a Bluetooth communication, an IEEE 802.11 communication, or any other appropriate communication interface.

In one embodiment, the customer interface device 300 may be used as a portable device roaming in an area where it can communicate with the merchant's computer networks wirelessly. For example, as customers exit a store, a customer interface device 300 may be used at an exit to verify that all items carried by exiting customers has been properly paid for and checked out. In some instances, there may be small items that have not been paid for, e.g., a kid's toy hidden by a child. The customer interface device 300 may be used to check out the toy on the spot. Therefore, a customer need not go back to a POS station or check out counter to purchase the toy. As described previously, if a customer has a customer account set up with the merchant, the customer may choose any payment options available, such as a credit card already on record, etc. Also, a generated transaction receipt may be stored electronically to a customer account or sent to an email address specified by the customer. In one embodiment, the customer interface device 300 may be adapted to dock at a docking station.

Embodiments of the example customer interface device 300 may be used in a variety of ways to improve a customer's shopping experience. For example, a customer may look for some specific items, and a store employee may help the customer locate the items and check out the items on the spot using the customer interface device 300. Thus the customer may avoid waiting in a line to check out the located items. In another example, a customer may pull up his/her car in a parking lot or next to a loading deck. A customer interface device 300 may be used to check out any items the customer wishes to put in his/her car on the spot. Therefore, the customer may save any time required to get in to the store and check out retrieved items at a POS counter.

In one embodiment, the customer interface device 300 may be used as a door entry unit to direct customers/members as they come in, or as a door exit unit to validate purchases and address other issues at customer/member exit time. In another embodiment, the customer interface device 300 may be used as a customer self service unit that provides customer access to services provided by a merchant (e.g., car service, pharmacy service, optical service). For example, as described above, a customer can use the customer interface device 300 to request an email or other notification to get status update on any of these ancillary services.

In one or more embodiments, the customer interface device 300 may include a processing unit (not shown). The processing unit may be, but not limited to, a single processor, a plurality of processors, a DSP, a microprocessor, an ASIC, a state machine, or any other implementation capable of processing and executing software. The term processing unit should not be construed to refer exclusively to hardware capable of executing software and may implicitly include DSP hardware, ROM for storing software, RAM, and any other volatile or non-volatile storage medium, such as, but not limited to, CD, DVD, ROM, RAM, EEPROM, or optical storage.

Figure 4:
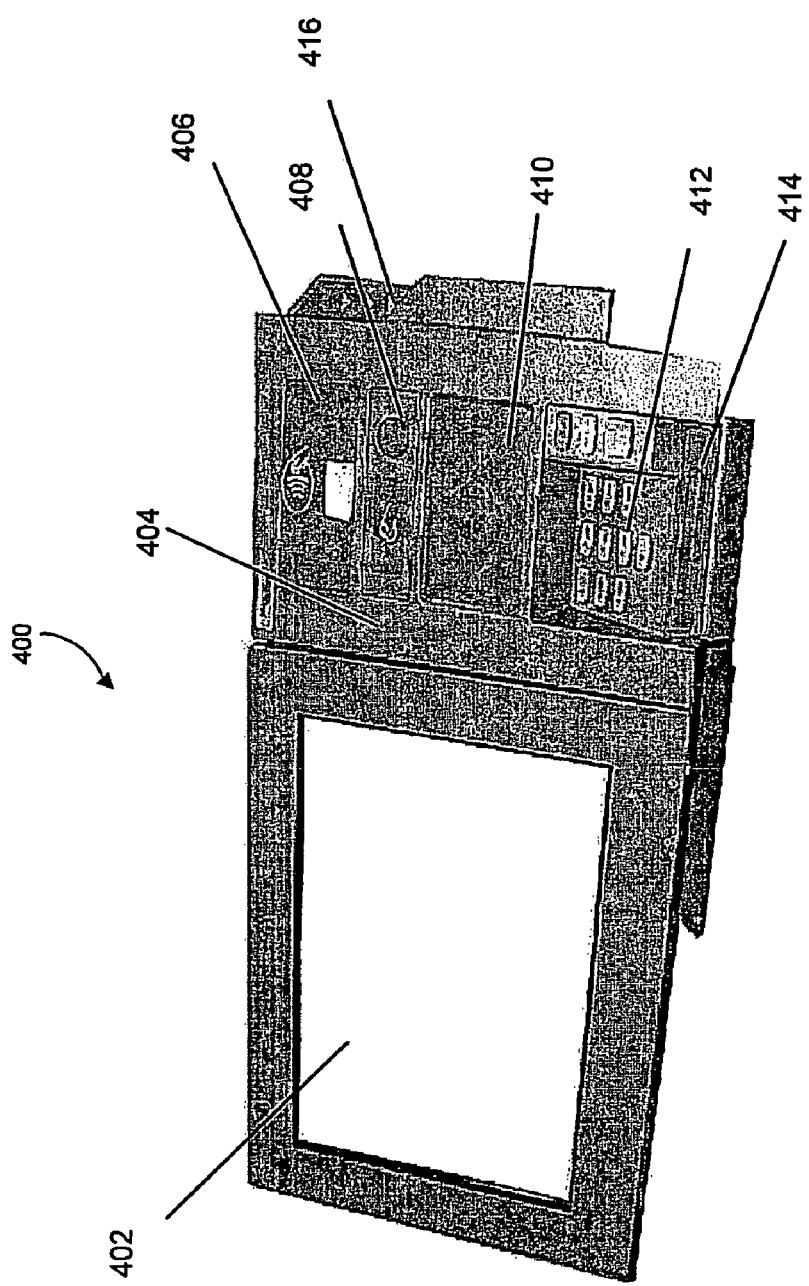
FIG. 4 shows yet another example customer interface device in accordance with an aspect of the present invention.

FIG. 4 shows an example customer interface device 400 in accordance with an aspect of the present invention. The example customer interface device 400 may comprise a screen display 402 and a functional panel 404. The functional panel 404 may comprise a variety of functional units (e.g., a touch pad 406, a biometrics unit 408, a signature pad 410, a keypad 412 and an extension card slot 414.) The functional unit 404 may further comprise a magnetic strip reader 416 as one side. In different embodiments, the position of each functional units may be arranged differently. For example, in one embodiment, the biometrics unit 408 may be a finger print scanner; and in another embodiment, the biometrics unit 408 may be a retinal scanner. Moreover, in one embodiment, the biometrics unit 408 may be arranged to be between the touch pad 406 and signature pad 410 as shown in FIG. 4; in another embodiment, the biometrics unit 408 may be arranged to be below the keypad 412. Further, in one embodiment, the input keys of the keypad 412 may comprise braille dots; in another embodiment, the input keys have no braille dots. Also, the extension card slot 414 may be arranged in different positions (e.g., below the keypad 412 as shown in FIG. 4, or switch the position with the biometrics unit 408 to be between the touch pad 406 and signature pad 410).

Embodiments of the present invention provide a single unit customer interface device. Different example embodiments 200, 300 and 400 show different arrangement of units of the device. In addition to those shown, other arrangement may be accomplished. For example, the display screen may be located at center and other units at four sides of the screen, or the display screen may be located at bottom and other units above the screen.

The example customer interface device may be a hand-held wireless unit or wired stationary unit that comprises all input/output functions. The customer interface device may provide a large screen to display information that facilitates interaction with a merchant's sales system in less space. Further, the customer interface device may offer services, advertisements and/or other information, while taking payment, coupons and enabling other interaction in less space. Software running on the customer interface device may be designed to move the intelligence out of the input/output devices into a merchant's main computer/register application. In this way, the merchant may have more control over future changes to the hardware/software of the customer interface device and to systems which support the customer interface device.

Those skilled in the art may appreciate from the foregoing description that the present invention may be implemented in a variety of forms, and that the various embodiments may be implemented alone or in combination. Therefore, while the embodiments of the present invention have been described in connection with particular examples thereof, the true scope of the embodiments and/or methods of the present invention should not be so limited since other modifications will become apparent to the skilled practitioner upon a study of the drawings, specification, and following claims.

What is claimed is:

1. A single integrated device for interfacing with a customer at a store, comprising:
    a touch screen for displaying information and receiving customer instructions;
    a keypad;
    a wireless sensor for scanning tags attached to merchandise of the store; and
    at least one user input component to accept customer payment for items to be purchased,
    wherein
        the touch screen, the keypad, the wireless sensor and the at least one user input component are detachable modular components,
        each of the keypad, the wireless sensor and the at least one user input component is detachably coupled to the touch screen to form the single integrated device, and
        when each of the keypad, the wireless sensor and the at least one user input component is coupled to the touch screen, each of the keypad, the wireless sensor and the at least one user input component is fixedly attached to the touch screen.

2. The device of claim 1, further comprising a bar-code scanner.

3. The device of claim 2, further comprising a radio frequency identification (RFID) scanner.

4. The device of claim 1, wherein the wireless sensor is a near field communication scanner.

5. The device of claim 1, wherein the at least one user input component is a magnetic strip reader.

6. The device of claim 1, further comprising a wireless connection unit for the device to be wirelessly connected to a local area network (LAN).

7. The device of claim 1, further comprising a wired connection unit for the device to be connected to a LAN via a wired connection.

8. The device of claim 1, further comprising a biometrics unit.

9. The device of claim 8, wherein the biometrics unit is a finger print scanner.

10. The device of claim 8, wherein the biometrics unit is a retinal scanner.

11. The device of claim 8, wherein the biometrics unit comprises both a retinal scanner and a finger print scanner.

12. The device of claim 1, wherein the touch screen is configured to for a customer to create a gift registry for desired items in the store.

13. The device of claim 12, wherein the touch screen is further configured for a customer to access a gift registry for desired items and to purchase one or more desired items of the gift registry using the device.

14. The device of claim 11, wherein the touch screen is configured for a customer to fill a prescription.

15. The device of claim 14, wherein the touch screen is further configured for a customer to submit a notification method when the prescription is ready for pick up.

16. The device of claim 1, wherein the touch screen is configured to allow a customer to log into a customer's account for conducting transactions through the customer's account.

17. The device of claim 16, wherein the touch screen is configured to present the customer an option to one of store a receipt in the customer's account and forward the receipt to an e-mail address specified by the customer.

18. A handheld portable device for interfacing with a customer at a store, comprising:
    a touch screen for displaying information and receiving customer instructions;
    a keypad;
    a wireless sensor for scanning tags attached to merchandise of the store;
    a wireless connection unit for wirelessly connecting the device to a computer network of the store; and
    at least one user input component to accept customer payment for items to be purchased,
    wherein
        the touch screen, the keypad, the wireless sensor and the at least one user input component are detachable modular components,
        each of the keypad, the wireless sensor and the at least one user input component is detachably coupled to the touch screen to form the handheld device, and
        when each of the keypad, the wireless sensor and the at least one user input component is coupled to the touch screen, each of the keypad, the wireless sensor and the at least one user input component is fixedly attached to the touch screen.

19. The handheld portable device of claim 18, further comprising a bar-code scanner, and wherein the wireless sensor comprises one or more of a radio frequency identification (RFID) scanner, and a near field communication scanner.

20. The handheld portable device of claim 18, wherein the at least one user input component is a magnetic strip reader.

21. The handheld device of claim 18, wherein the touch screen is configured to allow a customer to log into a customer's account for conducting transactions through the customer's account.

22. The handheld device of claim 21, wherein the touch screen is configured to present the customer an option to one of store a receipt in the customer's account and forward the receipt to an e-mail address specified by the customer.

* * * * *